Patented June 6, 1933

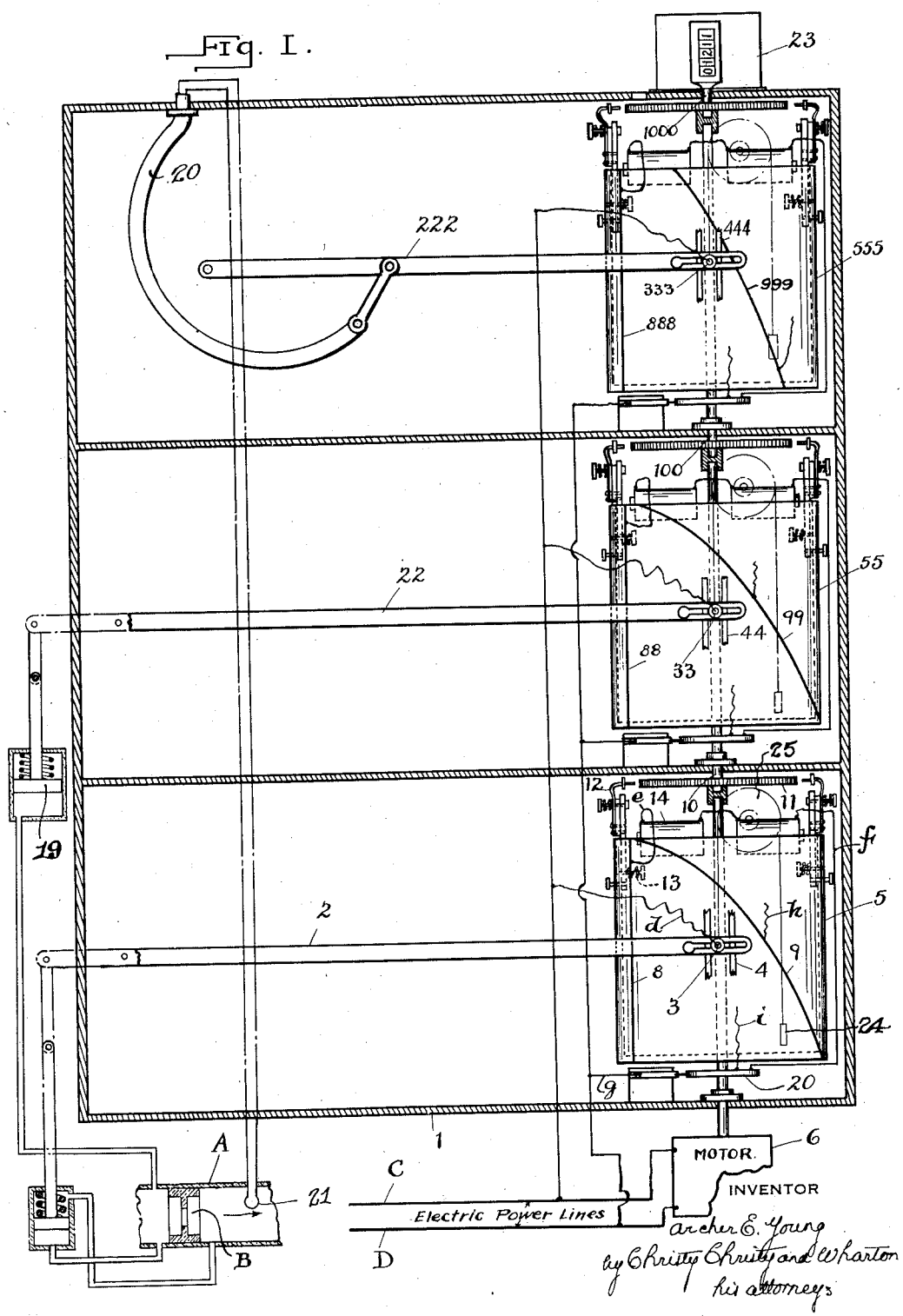

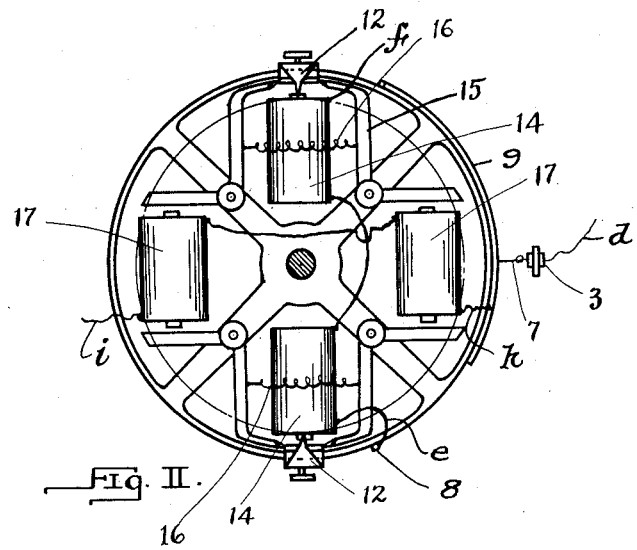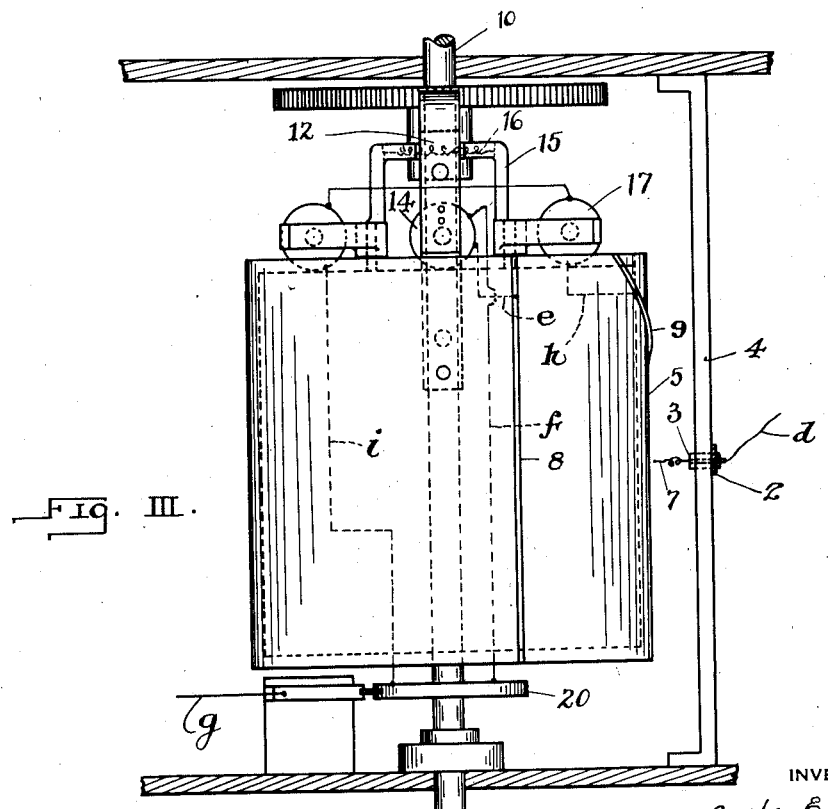

1,912,420

UNITED STATES PATENT OFFICE

ARCHER E. YOUNG, OF PITTSBURGH, PENNSYLVANIA

B. T. U. METER

Application filed February 28, 1930. Serial No. 432,059.

My invention relates to the measurement of heat units in a flow of gas. In the commercial use of steam power, it has become a common practice to sell steam, delivering it through conduits. Ordinarily, measurement is by volume or weight, but the valuable thing which is delivered is really power, and power is but imperfectly expressed in terms of volume or weight. Manifestly, a unit volume of superheated steam will contain a greater or less number of heat units, as its temperature is higher or lower; and, in order to ascertain the number of heat units delivered, it is necessary to know not merely the number of pounds weight delivered, but, additionally, it is necessary to know at what temperature and pressure the known number of weight units has been delivered. From these three factors, the number of units of power delivered may be determined. Ordinarily, however, steam is sold by weight. Inaccuracies in volumetric measurement, due to fluctuating temperature, have been disregarded, merely because there has been no practical way to do better. The apparatus of my invention affords by direct reading the heat units delivered in a flow of steam, as distinguished from the quantity or weight of steam delivered.

The meter of my invention is illustrated in the accompanying drawings. Fig. I is a view, partly in section, partly in elevation, of such an instrument. In this figure, the line of steam flow is indicated diagrammatically, and certain electric wiring also is indicated diagrammatically. Fig. II is a view to larger scale, showing in end elevation one of the rotary members which form parts of the instrument. Fig. III is a fragmentary view in section, showing in side elevation, and with greater elaboration in detail than Fig. I affords, the same rotary member.

A steam supply line is diagrammatically indicated at A, and the direction of flow through the line is indicated by an arrow. In the line is set an orifice plate B, and associated with the orifice B are instrumentalities of known character, responsive, one of them (18) to variations in differential pressure across the orifice, and another (19) to variations in static pressure of the steam supply. A Bourdon spring 20 may be understood to be responsive to a thermostat 21 arranged in the line of steam flow. Associated with this steam line is the instrument contained within the casing 1. Within this casing, the lever 2 is pivoted, and this lever 2 may be made to swing, as is diagrammatically indicated in Fig. I, in response to variation in the differential pressure of the flow of steam through the orifice B.

The lever 2, at its distal end, is slotted longitudinally, and carries, freely reciprocable in the slot, a block 3. Block 3 is engaged also by a guideway 4, which extends transversely of the length of arm 2. As the arm 2 swings, in response to variation in the differential pressure of the flow of steam, block 3 will move up and down in guideway 4, and, the arm being relatively long, the movement of the block 3 along the guideway will be always closely proportional to variation in the differential pressure. If it were a matter of direct reading of the movement of the block along its guideway, as an indication of steam flow, the inaccuracy due to the fact that the right-line movement of the block is not minutely proportional to the angular swing of the lever would be manifest; but, by virtue of the fact that the block co-operates with other mechanical parts, those other parts may be so far modified in their proportions as to afford correction, and to eliminate from the ultimate reading even such slight and relatively inconsiderable inaccuracy.

The weight of the lever 2, tending to turn it in clockwise direction, as seen in Fig. I, may be rendered ineffective by means of a counterweight 24 suspended by a line passing from the lever over a sheave 25 mounted in the wall of the casing 1. These parts are in Fig. I diagrammatically indicated in dotted lines.

In proximity to, and in parallelism with, the course of block 3 in its guideway, extends a constantly and uniformly advancing surface. In the particular instrument here illustrated, this surface is the surface of a cylinder 5, mounted for rotation on an axis parallel with guideway 4, and rotated at constant speed by suitable means, in this case by a motor 6. Block 3 may be understood to be equipped with a brush, which extends adjacent the surface of cylinder 5, and the surface of the cylinder may be understood to carry strips of conducting material, properly insulated and so disposed that cylinder rotation will effect the periodic making and breaking of an electric circuit through the strip and block. Conveniently, the cylinder surface, otherwise insulating, carries strips 8 and 9 of conducting material. Strip 8 extends longitudinally upon the surface of the cylinder and parallel with its axis, and strip 9 is so particularly shaped and disposed that at successive points longitudinally of the cylinder the distance between the strips, measured circumferentially, is proportional to the square root of the distance at which block 3, ranging longitudinally of the cylinder, is remote from a zero point. With reference to the instrument of the drawings, the strips 8 and 9 are shown to come into immediate proximity, one to the other, at the upper end of the cylinder. When no steam is flowing through the conduit A, it may be understood that lever 2 is in a position upwardly inclined from left to right, and that the brush 7 which the block 3 bears is just free of contact with the strips 8 and 9, at the point of their approximate meeting. As steam begins to flow in the conduit A, and as the differential pressure mounts, the lever 2 swing clockwise, and the block 3 moves from its zero point downward along the guideway 4. The strips 8 and 9 are so relatively situated that the distance between them, measured circumferentially, is proportional to the square root of the distance at which the block 3 stands downwardly remote from its zero point. It will be understood that in this respect also the drawings are diagrammatic. No attempt has been made so to plot the positions of the strips 8 and 9 as to render the drawings a literal presentation of the equation stated. I have alluded to the fact that, inasmuch as the range of travel of block 3 along its guideway is not minutely proportional to the angular swing of the lever 2, there is opportunity in the particular placement of the strips 8 and 9 to make compensation, so that at every position of the block the space interval between the strips shall be the accurate expression of the square root of the differential pressure of the stream of steam.

A shaft 10 is mounted independently for rotation coaxially with cylinder 5. Shaft 10 carries integrally a clutch member, in the form of a disc 11. Cylinder 5 carries one or more clutch members, in the form of swinging arms 12, which extend longitudinally beyond the head of the cylinder, and opposite the face of disc 11. The arms may be swung to and from engagement with the disc. The face of the disc and the outer ends of the arms are suitably adapted to serve the clutch purposes indicated. To such end, the face of the disc may be serrated, and the arms may terminate in sharp points adapted to enter into and to be withdrawn from engagement with the serrations. Conveniently there are two arms 12, arranged in diametrically opposite positions on cylinder 5. Normally the arms 12 are held by springs 13 retracted and free from engagement with the disc, and from such position they are swung inwardly against the tension of the springs by means of electromagnets 14. The magnets 14 are borne by cylinder 5, and are so situated that, when energized, they attract the arms and draw them inward. To this end the arms themselves are formed of, or carry blocks of, magnetic material.

At this point it is well to refer to Figs. II and III. Co-operating with the arms 12 are spring latches 15, borne also by the cylinder 5. When by the energizing of electromagnets 14 the arms 12 are swung inward to clutch-closing position, the latches 15, which under tension of springs 16 had been bearing laterally upon the sides of the arms, are now by the same springs 16 drawn together, to positions behind the arms 12, and thus they become effective to secure the arms in clutch-closing positions. A second pair of electromagnets 17 is provided, borne also by cylinder 5, and so arranged that, when energized (in alternation with the energizing of magnets 14), they will be effective to swing the latches 15 against the tension of springs 16, from the latching positions to which they had swung, back to unlatching positions again. When this has occurred, the arms 12, freed of restraint, will swing again under the tension of their springs 13 back to their position of clutch release. By such provision, shaft 10 is caused to rotate in unison with the motor-driven cylinder 5, so long as the clutch is closed. When the clutch opens, shaft 10 comes to rest.

The small amount of electric energy required for energizing the electromagnets 14 and 17 may be derived from any suitable source. I have shown the motor 6 to be an electric motor, and I have shown a feed circuit CD for this motor. From such a circuit the electromagnets may conveniently be energized. The cylinder 5 bears rigidly upon and insulated from its shaft a ring 20 of conducting material. Upon this ring a brush, arranged as shown in Figs. I and III, make sliding contact as the ring rotates. When, in the course of cylinder rotation, the brush 7, with which the block 3 is equipped, makes contact with strip 8, a circuit is closed through the magnets 14 (a circuit which may be traced in Fig. I, from line C, through connections $d$, $e$, $f$, and $g$, to line D), energizing them; and the clutch closes. The electromagnets 14, when they have performed their part in the operation, become deenergized again by the advance of the cylinder-borne strip 8 from contact with brush 7. The clutch, however, by the instrumentalities already described, remains closed. In the further rotation of the cylinder 5, when the brush makes contact with the strip 9, a circuit is closed through the alternate pair of electromagnets 17 (from feed wire C through connections $d$, $h$, $i$, and $g$, to feed wire D), and the energizing of these electromagnets 17 effects the release of the clutch. The electromagnets 17 in their turn, after performing their office, are de-energized again, as the continued turning of cylinder 5 effects the breaking of the contact of brush 7 with the strip 9.

It will be perceived that, with every rotation of the cylinder 5, the shaft 10 will turn through a fraction of a complete rotation, and that the value of that fraction will be greater or less, according to the position of block 3 in its guideway 4, and according to the circumferential range of brush 7 over cylinder 5, between its successive contacts with strips 8 and 9. That range, as has been explained, is proportional to the square root of the differential pressure of the steam flowing in conduit A through orifice B. The extent of rotation of shaft 10 then, within any given interval of time, is an expression of the volume flow of steam (neglecting static pressure change), inasmuch as flow is proportional to the square root of the differential pressure. And it is apparent that, if a tally were driven directly by shaft 10, a suitable proportioning of parts would suffice to afford a reading of the volume of steam delivered (other variations being neglected).

The quantity of a gas which, in a measured interval of time, passes an orifice is dependent, not on the differential pressure only, across the orifice, but on the static pressure also. Other things being equal, the quantity varies as the square root of the static pressure. Accordingly, the instrument of Fig. I of the drawings includes correction for variation in static pressure. Upon the shaft 10, whose rotation in a given interval of time varies according to variation in the square root of the differential pressure of the steam flow, a second cylinder 55 is rigidly carried. This second cylinder is in its essential features of structure a duplicate of the cylinder 5 already described. It bears upon its face strips 88 and 99 of conducting material, properly insulated; and, co-operating with this second cylinder, a lever 22, bearing a block 33, traveling in a guideway 44, swings in response to variation in the static pressure of the steam supply. Particular arrangement of the contact strips 88 and 99 upon the cylinder 55 may be understood to be such that, for each complete rotation of cylinder 55, a shaft 100, co-ordinated with it in like manner as shaft 10 is co-ordinated with cylinder 5, will turn through an angle which varies in value proportionately to the square root of the value of the static pressure. When these two devices are organized in the manner shown and described, the shaft 100 will, in any given interval of time, turn through an angle whose value will be indicative of the quantity of steam which flows in conduit A, with correction for variations both in the differential and in the static pressures.

The quantity of heat, the number of heat units in the flowing stream, depends, additionally, upon the temperature of the stream. A given weight of steam will contain a greater or less number of heat units, according as its temperature is relatively high or low, and in this connection the following formula is of general application.

$$B.\ t.\ u. = \left(1 - \frac{Cp^{\frac{1}{4}}}{BT}\right)\frac{C_b}{k}T$$

in which formula B. t. u. is the conventional indication of heat units; B is a constant whose value for steam is 92.835, say; C is a constant whose value for steam is 938.82, say; $k$ is a constant whose value for steam is four thirds; $C_b$ is a constant whose value for steam is 0.48; $p$ stands for varying static pressure of the steam; T stands for its temperature. It will thus be seen that the heat units per pound weight in a flowing stream of steam vary, and that variations both of temperature and of pressure result in variations in the number of heat units in a given unit of weight. However, variations because of pressure changes are of minor importance and may be neglected, or if desired, allowed for by modification of the curve 99 on cylinder 55. It remains to describe provision for B. t. u. computation, with variation due to temperature.

Upon the shaft 100, which is immediately driven through the clutch mechanism mounted on cylinder 55, a third cylinder 555 is rigidly mounted. This cylinder, in its essential features of construction, is identical with cylinders 5 and 55, and through like clutch members it drives a shaft 1000. Co-operating with cylinder 555 is a lever 222, which lever may, as is diagrammatically indicated, be made to swing by means of Bourdon spring 20 in response to the action of thermostat 21. The strips 888 and 999, with which the cylinder 555 is provided, are so situated that, during each complete rotation of the cylinder 555, the clutch mechanism will remain closed and the shaft 1000 rotated through a greater or less angle, according to the position of the lever 222, and according to the position of the block 333 in its guideway 444. The greater the temperature, the wider the interval at which the strips 888 and 999 stand apart circumferentially. And by the particular placement of these strips, correction is made, so that in a given interval of time the shaft 1000 will turn through a greater or less angle, according to the number of heat units carried per pound of steam flowing in the conduit A.

A tally meter 23 is driven by shaft 1000, and, by properly proportioned gearing, the tally meter may afford direct reading of the number of heat units carried.

It remains to say that the instrument described is an instrument for measuring the heat units borne by a stream of dry steam. If the steam be wet, an error enters into the measurement, an error which is present in all steam measurement.

As a matter of practice, it is entirely possible to eliminate variation in the static pressure of the stream of steam, by subjecting the steam to regulator control. And if, in a particular case, the steam be so controlled, and variation in static pressure be eliminated, it is obviously entirely practicable to eliminate from the organization the cylinder 55, and to cause the cylinder 5 to drive directly the shaft 100; or, if the instrument be already provided, it is entirely possible to disconnect the clutch-opening electromagnets with which the cylinder 55 is provided, and to cause the clutch with which the cylinder 55 is provided to remain permanently closed.

I claim as my invention:

1. In association with a gas conduit in which an orifice is arranged, an instrument for measuring the heat units delivered by a stream of gas as it flows in such conduit including four axially aligned, independently mounted, rotary members, means for imparting continuous rotation to the first of the series of the four said members, the said first member being provided with a clutch adapted alternately to engage and to release the second rotary member, and the second member adapted to be engaged by the clutch borne by the first member and being provided with a clutch adapted alternately to engage and to release the third, and the third member adapted to be engaged by the clutch borne by the second member and being provided with a clutch adapted alternately to engage and to release the fourth, the fourth member being adapted to be engaged by the clutch borne by the third member, means responsive to variation in the differential pressure in a stream of gas flowing in said conduit and through the orifice therein for controlling the clutch with which one of the first three of said members is provided, means responsive to variation in the static pressure in the same stream of gas for controlling the clutch with which another of the first three of said members is provided, and means responsive to variation in the temperature of the same stream of gas for controlling the clutch with which a third of the first three of said members is provided.

2. In combination with a conduit for gas, means for measuring the quantity of heat units carried by a stream of gas flowing in the conduit, such means including a movable member, means for moving such member in a given interval of time through a greater or less range, according as the quantity of gas flow is great or small, a second movable member, means for intermittently uniting the two said members, two electromagnets adapted to control said uniting means, a magnet-energizing circuit for said electromagnets, and make-and-break mechanism arranged in such circuit including two contact pieces and a brush, the said contact pieces being borne by the movable member first named and extending upon the surface thereof transversely of the direction of movement thereof and diverging one from another in their extent, and means for moving the said brush relatively to the movable member in a direction transverse to the direction of movement of such member and in response to variation in temperature at a single point in the stream of gas, the said circuit with the said contact pieces being so arranged that in the advance of the movable member the successive engagements of the two contact pieces with the brush effect the successive energizing of the two electromagnets.

3. In combination with a conduit for gas, means for measuring the quantity of heat units carried by a stream of gas flowing in the conduit, such means including two independently rotatable members coaxially mounted, two co-operating clutch parts borne severally by the said members, the clutch part borne by one of the said members being movable to and from engagement with the other clutch part, means for rotating the member which bears the movable clutch part in accord with the quantity of gas flowing in such conduit, and an electric control for the said movable clutch part including co-operating contact pieces of which one is movable in accord with variation in the temperature of the stream of gas flowing in such conduit, and in a course which extends transversely of the direction in which the rotatable member last mentioned rotates, and another is borne by the rotatable member last mentioned, the contact piece last named being so positioned that the clutch continues in closed position during a fraction of each rotation of the rotatable member which bears it, and a fraction which is great or less, according to the instant position of the contact piece first named.

In testimony whereof I have hereunto set my hand.

ARCHER E. YOUNG.